(12) United States Patent
Bagaria

(10) Patent No.: US 10,844,292 B2
(45) Date of Patent: Nov. 24, 2020

(54) ENHANCED PERFORMANCE OF SULFIDE SCAVENGERS

(71) Applicant: General Electric Company, Schenectady, NY (US)

(72) Inventor: Hitesh Ghanshyam Bagaria, The Woodlands, TX (US)

(73) Assignee: General Electric Company, Schenectady, NY (US)

(*) Notice: Subject to any disclaimer, the term of this patent is extended or adjusted under 35 U.S.C. 154(b) by 88 days.

(21) Appl. No.: 16/320,128

(22) PCT Filed: May 26, 2017

(86) PCT No.: PCT/US2017/034629
§ 371 (c)(1),
(2) Date: Jan. 24, 2019

(87) PCT Pub. No.: WO2018/026428
PCT Pub. Date: Feb. 8, 2018

(65) Prior Publication Data
US 2019/0270940 A1    Sep. 5, 2019

Related U.S. Application Data

(60) Provisional application No. 62/370,308, filed on Aug. 3, 2016.

(51) Int. Cl.
| | | |
|---|---|---|
| C10G 29/24 | (2006.01) | |
| C10G 75/02 | (2006.01) | |
| C10G 75/00 | (2006.01) | |
| B01D 53/10 | (2006.01) | |
| C10G 29/00 | (2006.01) | |
| C10G 29/20 | (2006.01) | |
| C10G 29/22 | (2006.01) | |

(52) U.S. Cl.
CPC ............ *C10G 29/24* (2013.01); *B01D 53/10* (2013.01); *C10G 29/00* (2013.01); *C10G 29/20* (2013.01); *C10G 29/22* (2013.01); *C10G 75/00* (2013.01); *C10G 75/02* (2013.01); *C10G 2300/308* (2013.01); *C10G 2300/44* (2013.01); *C10G 2300/802* (2013.01); *C10G 2300/805* (2013.01)

(58) Field of Classification Search
CPC ........ C10G 29/20; C10G 29/22; C10G 29/24; C10G 75/00; C10G 75/02; B01D 53/48; B01D 53/52
See application file for complete search history.

(56) References Cited

U.S. PATENT DOCUMENTS

| | | | |
|---|---|---|---|
| 5,347,004 A | 9/1994 | Rivers et al. | |
| 5,488,103 A | 1/1996 | Gatlin | |
| 7,078,005 B2 * | 7/2006 | Smith | ........................ C10L 3/10 |
| | | | 423/226 |
| 2013/0172623 A1 * | 7/2013 | Kaplan | ..................... C02F 1/68 |
| | | | 564/471 |
| 2015/0291890 A1 | 10/2015 | Garcia, III | |
| 2016/0175769 A1 * | 6/2016 | Kamoun | ................ B01D 53/52 |
| | | | 252/189 |

FOREIGN PATENT DOCUMENTS

| | | |
|---|---|---|
| WO | 2013/049027 A1 | 4/2013 |
| WO | 2013/101361 A1 | 7/2013 |
| WO | 2016/100224 A2 | 6/2016 |

OTHER PUBLICATIONS

International Search Report for Appl. No. PCT/2017/034629 dated Aug. 29, 2017, pp. 1-3.

\* cited by examiner

*Primary Examiner* — Renee Robinson
(74) *Attorney, Agent, or Firm* — Wegman Hessler

(57) ABSTRACT

Methods for making sulfide scavenging compositions are provided. The method comprises reducing a settling velocity of the sulfide scavenging composition in a fluid stream by adjusting the specific gravity of the sulfide scavenging composition to within about fifteen percent or less of the specific gravity of the fluid stream. Sulfide scavengers using the above method are also disclosed. Methods for removing sulfides from fluid streams are also provided. The methods include adding the above sulfide scavengers to fluid streams.

22 Claims, 3 Drawing Sheets

US 10,844,292 B2

ENHANCED PERFORMANCE OF SULFIDE SCAVENGERS

CROSS REFERENCE TO RELATED APPLICATION

This application claims priority to PCT Appl. Serial No. PCT/US2017/034629, filed May 26, 2017, which claims the benefit of U.S. Provisional Application Ser. No. 62/370,308, filed Aug. 3, 2016, the entireties of which are incorporated herein by reference.

FIELD OF INVENTION

The present disclosure relates to methods and compositions for reacting with sulfides, and more particularly, for removing sulfides from fluid streams.

BACKGROUND OF THE INVENTION

Hydrogen sulfide is a clear toxic gas with a foul odor. It is also highly flammable. The Environmental Protection Agency and other regulatory agencies worldwide strictly control the release of hydrogen sulfide into the environment. Hydrogen sulfide is often present in well water, waste water, and other aqueous streams. Hydrogen sulfide may also be present in industrial process streams such as crude oil and natural gas reserves, and must be removed before using.

The removal of hydrogen sulfide from industrial process streams presents a challenge in many industries. Generally, hydrocarbon streams can be treated with chemical scavengers to remove sulfides. These chemicals are called scavengers or sweetening agents. Certain aldehydes are known to be useful for this purpose. However, the use of aldehydes, such as glyoxal, can cause increased corrosion and damage to the metals of processing and refinery equipment.

Conventionally, the addition of surfactants, neutralizing agents and buffers, and corrosion inhibitors have been used to enhance the performance of glyoxal based scavengers, and to reduce the corrosion associated with their use.

SUMMARY OF THE INVENTION

In certain aspects of the invention, a method for making a sulfide scavenger comprises reducing a settling velocity of the scavenger in a target industrial process fluid by adjusting a specific gravity of the sulfide scavenger to be within about fifteen percent or less of a specific gravity of the target industrial process fluid.

In another embodiment, the method for making a sulfide scavenger comprises adjusting the specific gravity of the sulfide scavenger to within about five percent or less of the specific gravity of the target industrial process fluid.

In another embodiment, the method for making a sulfide scavenger comprises adjusting the specific gravity of the sulfide scavenger to within about one percent or less of the specific gravity of the target industrial process fluid.

In an embodiment, a method for making a sulfide scavenger comprising reducing a settling velocity of the sulfide scavenger in a target industrial process fluid by adjusting a specific gravity of a solution comprising at least one of an aldehyde, hemiacetal, acetal, hexahydrotriazine, amine, amine-aldehyde adduct, hydantoin, oxazolidine, transition metal salt, and an alkali metal hydroxide to within about fifteen percent or less of a specific gravity of the target industrial process fluid.

In another embodiment, a method for removing sulfide in an industrial process fluid comprises obtaining a measurement of a specific gravity of the industrial process fluid, obtaining a measurement of a specific gravity of a scavenger composition comprising at least one aldehyde, reducing a settling velocity of the scavenger composition in the industrial process fluid by adjusting the specific gravity of the scavenger composition to within about fifteen percent or less of the specific gravity of the industrial process fluid, and adding to the industrial process fluid an effective amount of the adjusted scavenger composition.

In an embodiment, the aldehyde comprises at least one of formaldehyde, glyoxal, glutaraldehyde, acrolein, glyoxylic acid, and combinations thereof. The weight percent (wt %) of the aldehyde is from about 1 percent by weight to about 25 percent by weight of a total weight of the sulfide scavenger solution. In other embodiments, the aldehyde is present from about 5 percent by weight to about 20 percent by weight of a total weight of the solution.

In another embodiment, a method for removing sulfide in an industrial process fluid comprises decreasing the specific gravity of the scavenger composition by adding a solvent in a quantity sufficient to cause the specific gravity of the scavenger composition to be within about fifteen percent or less of the specific gravity of the industrial process fluid.

In another embodiment, a method for removing sulfide in an industrial process fluid, comprising obtaining a measurement of a specific gravity of the industrial process fluid, obtaining a measurement of a specific gravity of a scavenger composition comprising at least one hexahydrotriazine, reducing a settling velocity of the scavenger composition in the industrial process fluid by adjusting the specific gravity of the scavenger composition to within about fifteen percent or less of the specific gravity of the industrial process fluid, and adding to the industrial process fluid in an effective amount of the adjusted scavenger composition.

In another embodiment, a method for reducing sulfides from a fluid stream, the method comprises contacting the fluid stream with a sulfide scavenger, wherein the sulfide scavenger was prepared by a method comprising adjusting a specific gravity of the sulfide scavenger to within about fifteen percent or less of a specific gravity of the fluid stream. Yet another embodiment discloses a sulfide scavenger prepared by any of the above methods.

The various embodiments provide an improved sulfide scavenging process for liquid hydrocarbon media that reduces, for example, hydrogen sulfide while minimizing corrosion to processing equipment.

BRIEF DESCRIPTION OF THE DRAWINGS

This invention will be further described in the appended drawings wherein.

DETAILED DESCRIPTION

Figure 1:
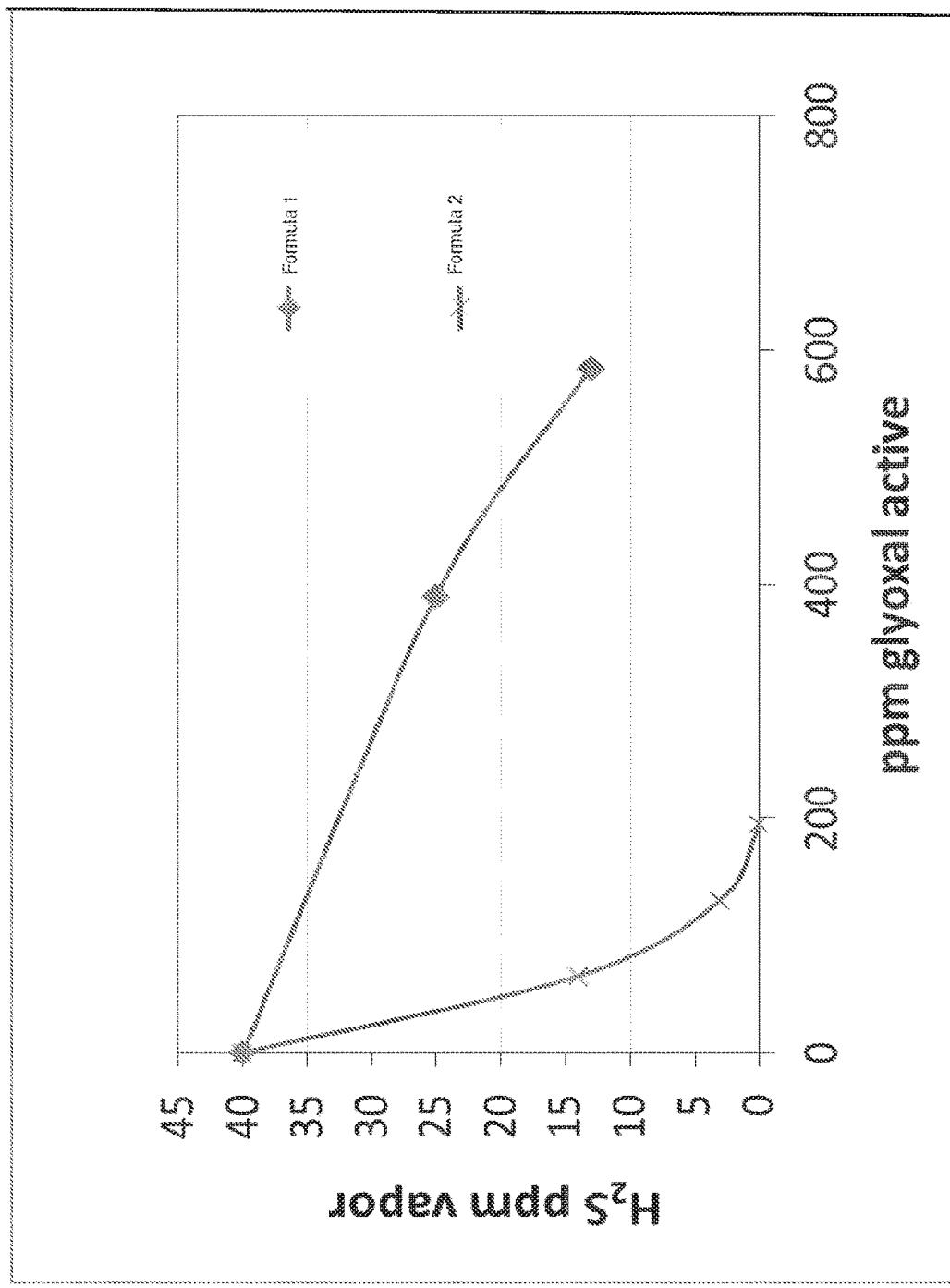
FIG. 1 is a graphical representation of the results obtained upon use of the sulfide scavenger of the invention in bunker fuel as referred to in Example 1.

In one aspect of the invention, the method for reducing sulfides from a fluid stream can be used to reduce sulfides, including organic sulfides and hydrogen sulfide ($H_2S$) in an industrial process fluid, also referred to herein as a fluid stream, and a target industrial process stream. A fluid stream encompasses a liquid stream. In one embodiment, the fluid stream may be a fluid hydrocarbon stream or an aqueous fluid stream. Hydrocarbon streams can include, but are not limited to, unrefined and refined hydrocarbon products, derivatives from petroleum or the liquefaction of coal, naphtha, wellhead condensate, crude oil or distillates such as gasolines, bunker fuels, distillate fuels, oils and residual fuels.

The fluid streams can be treated continuously or in a batch process near a wellhead. Continuous treatment installations near the wellhead can be used to inject scavengers directly into the hydrocarbon pipeline. The injection system can include a chemical injection pump or piping tees to introduce the scavengers into the pipeline. A length of the pipeline allows for contact between the scavenger and the sulfide. The scavengers can be used neat or diluted with water, glycol, glycol ethers, or alcohols.

The various embodiments provide for an improved sulfide scavenger, also referred to herein as a scavenger, or scavenger composition, with increased scavenging activity, reduced reaction times, and reduced corrosion to processing equipment.

In an embodiment, a method for making a sulfide scavenger comprises reducing a settling velocity of the scavenger in a target industrial process fluid by adjusting a specific gravity of a solution comprising at least one aldehyde to within about fifteen percent or less of a specific gravity of the target industrial process fluid.

In another embodiment, the method for making a sulfide scavenger comprises adjusting the specific gravity of the solution to within about one percent or less of the specific gravity of the target industrial process fluid.

In an embodiment, a method for removing sulfide in an industrial process fluid includes adjusting the specific gravity of the scavenger composition by decreasing the specific gravity of the sulfide scavenger by adding a solvent in a quantity sufficient to cause the specific gravity of the sulfide scavenger to be within about fifteen percent or less of the specific gravity of the fluid stream. The solvent can include water, alcohols, glycols, glycol ethers, and combinations thereof.

In an embodiment, a method for removing sulfide in an industrial process fluid includes adjusting the specific gravity of the scavenger composition by increasing the specific gravity of the scavenger composition by adding an aldehyde or triazine solution in a concentration and a quantity sufficient to cause the specific gravity of the scavenger composition to be within about five percent or less of the specific gravity of the industrial process fluid.

In an embodiment, the specific gravity of the scavenger composition is adjusted to within about five percent or less of the specific gravity of the industrial process fluid. In other embodiments, the specific gravity of the scavenger composition is adjusted to within about one percent or less of the specific gravity of the industrial process fluid. The specific gravity of the scavenger composition can also be adjusted by adding an aldehyde solution in a concentration and a quantity sufficient to cause the specific gravity of the scavenger composition to be within about ten percent or less of the specific gravity of the fluid stream.

In one embodiment, the disclosure is directed to a method for employing an aldehyde in an aqueous solution while mitigating corrosion to metal in contact with the aldehyde solution, the method employing a reduction of the settling velocity of the aldehyde solution. In practicing the various embodiments of the disclosure, an aldehyde aqueous solution can be utilized. The scavenger composition can include an aldehyde aqueous solution comprising greater than ten percent water.

The aldehydes which can be utilized in the practice of the method of the disclosure include, but are not limited to, formaldehyde, glyoxal, glutaraldehyde, acrolein, glyoxylic acid, and combinations thereof. Most any aldehyde that can be employed in an aqueous solution and is effective at sulfide scavenging can be utilized. Glyoxal is a water-soluble aldehyde and can include oligomers of glyoxal. Glyoxal is commercially available as a 40 weight percent aqueous solution.

In an embodiment, the aldehyde is present in the scavenger composition from about 10 percent by weight to about 50 percent by weight of the total weight of the scavenger composition based on the total weight of the reaction composition. In another embodiment, the aldehyde is present from about 20 percent by weight to about 40 percent by weight. In one embodiment, the aldehyde is present from about 1 percent by weight to about 25 percent by weight, based on the total weight of the reaction composition. In another embodiment, the aldehyde is present from about 5 percent by weight to about 20 percent by weight.

A number of triazines useful in the compositions of this disclosure are commercially available. Typically, triazines are formed by reacting amines with an aldehyde, especially formaldehyde as is well known in the art.

In an embodiment, the triazine is present in the scavenger composition from about 10 percent by weight to about 50 percent by weight of the total weight of the scavenger composition based on the specific gravity of the target fluid. In another embodiment, the triazine is present from about 20 percent by weight to about 40 percent by weight. In one embodiment, the triazine is present from about 1 percent by weight to about 25 percent by weight, based on the total weight of the reaction composition. In another embodiment, the triazine is present from about 5 percent by weight to about 20 percent by weight.

A solvent can be used to adjust the specific gravity of the sulfide scavenger composition. The sulfide scavengers are miscible in water; therefore, suitable solvents include water and water-miscible solvents. Specific examples of suitable solvents include, but are not limited to, water, alcohols, glycols, and glycol esters.

The solvent can be blended with the scavenger composition in any conventional manner. In one embodiment, the adjusted scavenger composition can be mixed into the fluid stream. In another embodiment, the adjusted scavenger composition can be dispersed with the fluid stream as the fluid stream is transported through a pipe or tube. The adjusted scavenger composition can be added in one or more batch modes, and repeated additions can be made.

In one embodiment, the solvent can comprise at least one member selected from the group consisting of water, alcohols, glycols, and glycol ethers. There is no limit on how much solvent can be used. In an embodiment, the solvent can be present from about 10 percent by weight to about 90 percent by weight, based on the total weight of the scavenger composition. In another embodiment, the solvent can be present from about 1 percent by weight to about 25 percent by weight. In another embodiment, the solvent can be present from about 50 percent by weight to about 75 percent by weight. In yet another embodiment, the solvent can be present from about 5 percent by weight to about 10 percent by weight, based on the total weight of the scavenger composition.

Another embodiment discloses a method for making a sulfide scavenger comprising reducing a settling velocity of the sulfide scavenger in a target industrial process fluid by adjusting a specific gravity of a solution comprising at least one of an aldehyde, hemiacetal, acetal, hexahydrotriazine, amine, amine-aldehyde adduct, hydantoin, oxazolidine, transition metal salt, and an alkali metal hydroxide to within about fifteen percent or less of a specific gravity of the target industrial process fluid.

The specific gravity of the solution can be adjusted to within about five percent or less of the specific gravity of the target industrial process fluid. In other embodiments, the specific gravity of the solution is adjusted to within about one percent or less of the specific gravity of the target industrial process fluid. The sulfide scavenger can include a non-ionic surfactant, and a quaternary ammonium surfactant.

A transition metal salt can include a cation member, for example, zinc, iron, copper, molybdenum, cobalt, manganese, and combinations thereof, and at least one anion member, for example, chloride, acetate, nitrate, nitrite, carbonate, citrate, phosphate, sulfate, sulfite, gluconate, and combinations thereof.

The amine-aldehyde adduct comprises a reaction product of the aldehyde with any of polyamines, secondary amines, and combinations thereof. The aldehyde can include formaldehyde, glyoxal, glutaraldehyde, acrolein, glyoxylic acid, and combinations thereof. The alkali metal hydroxide can include sodium hydroxide and potassium hydroxide.

The hexahydrotriazine can include a reaction product with any of monoethanolamine, methylamine, methoxypropylamine, isopropanolamine and combinations thereof. The hexahydrotriazine can include monoethanolamine hexahydrotriazine, and methylamine hexahydrotriazine.

The hemiacetal can include a reaction product of an aldehyde with an alcohol, for example, methanol, ethylene glycol, glycerol, propylene glycol, butanol, glucose, and combinations thereof. The hemiacetal can include one or more reaction products, for example, the reaction product of ethylene glycol and formaldehyde, glycerol and formaldehyde, propylene glycol and formaldehyde, glucose and formaldehyde, glyoxal and methanol, glyoxal and ethanol, glyoxal and propanol, and glyoxal and butanol.

The hydantoin can include any of dimethylol dimethyl hydantoin, methylol dimethyl hydantoin, dimethyl hydantoin and combinations thereof.

Another embodiment discloses a method for removing sulfide in an industrial process fluid by obtaining a measurement of the specific gravity of the industrial process fluid, obtaining a measurement of the specific gravity of a scavenger composition, reducing the settling velocity of the scavenger composition in the industrial process fluid by adjusting the specific gravity of the scavenger composition to within about five percent or less of the specific gravity of the industrial process fluid, adding to the industrial process fluid in an effective amount of the adjusted scavenger composition. Another embodiment discloses a method for removing sulfide in an industrial process fluid wherein the specific gravity of the scavenger composition to within about one percent or less of the specific gravity of the industrial process fluid.

The amount of sulfide scavengers added to a fluid stream will depend on the application and amount of sulfide scavenging required. In one embodiment, the sulfide scavenger is added to the fluid stream in an amount ranging from about 10 to about 100,000 ppm by volume of the fluid stream. In another embodiment, the sulfide scavenger is added to the fluid stream in an amount ranging from about 100 to about 50,000 ppm by volume of the fluid stream. Alternatively, the sulfide scavenger is added to the fluid stream in an amount ranging from about 600 to about 3,000 ppm by volume of the fluid stream.

While not being bound by any theory, it is nevertheless believed that the adjusting the specific gravity of the scavenger employed in the method of the present disclosure works in at least two ways to remove sulfide and thus prevent corrosion. Firstly, it is believed that matching the specific gravity of the scavenger to the process fluid allows additional time and opportunity for reaction of the scavenger with the $H_2S$ in the target fluid. Secondly, it is believed that the increased reaction of the scavenger with the hydrogen sulfide results in less scavenger available to react with the vessel thereby preventing, or at least minimizing, this corrosion mechanism.

In order that those skilled in the art will be better able to practice the present disclosure, the following examples are given by way of illustration and not by way of limitation.

EXAMPLES

Example 1

With reference to FIG. 1, in this example two experiments were conducted utilizing sour bunker fuel at 75° C. as the target fluid, and scavenger formulas which included an aldehyde. The aldehyde was glyoxal. The specific gravity of the target fluid was 0.99.

A first experiment utilized a glyoxal based scavenger Formula 1. The scavenger Formula 1 was 40% by weight aqueous glyoxal having a specific gravity of 1.26. The difference in specific gravity between the target fluid and the scavenger Formula 1 was 0.27. It can be seen from FIG. 1 that the $H_2S$ level was reduced to <15 ppm by volume, as measured in the vapor phase, at approximately 600 ppm of active glyoxal.

A second experiment utilized a glyoxal based scavenger Formula 2. The specific gravity of the scavenger Formula 2 was 1.04. Formula 2 was prepared by adding a solvent to Formula 1 in an amount effective to decrease the specific gravity to 1.04. The solvent used was water. Formula 2 was a 6-fold dilution of Formula 1. The difference in specific gravity between the target fluid and the scavenger Formula 2 was 0.05. It can further be seen from FIG. 1, that the $H_2S$ vapor was reduced to near zero ppm by volume, as measured in the vapor phase, at approximately 200 ppm of active glyoxal.

The difference in specific gravity between Formula 2 and the target fluid is five times lower than that of Formula 1. That is, 0.05 as compared to 0.27. While not wishing to be bound by any theory, it is nevertheless believed that the decreased difference in specific gravity between the scavenger Formula 2 and the target fluid resulted in a decreased settling rate of the scavenger formula in the target fluid, thereby providing additional time and opportunity for reaction of the scavenger with the $H_2S$ in the target fluid.

In viscous fluid dynamics, the Archimedes number is used to determine the motion of fluids due to density differences. The decreased difference in specific gravity between the scavenger Formula 2 and the target fluid decreased the Archimedes number of the resulting mixture of the target fluid and the scavenger, thereby reducing settling time by slowing down the motion of fluids due to density differences, and providing additional time and opportunity for reaction of the scavenger with the $H_2S$ in the target fluid.

Example 2

Figure 2:
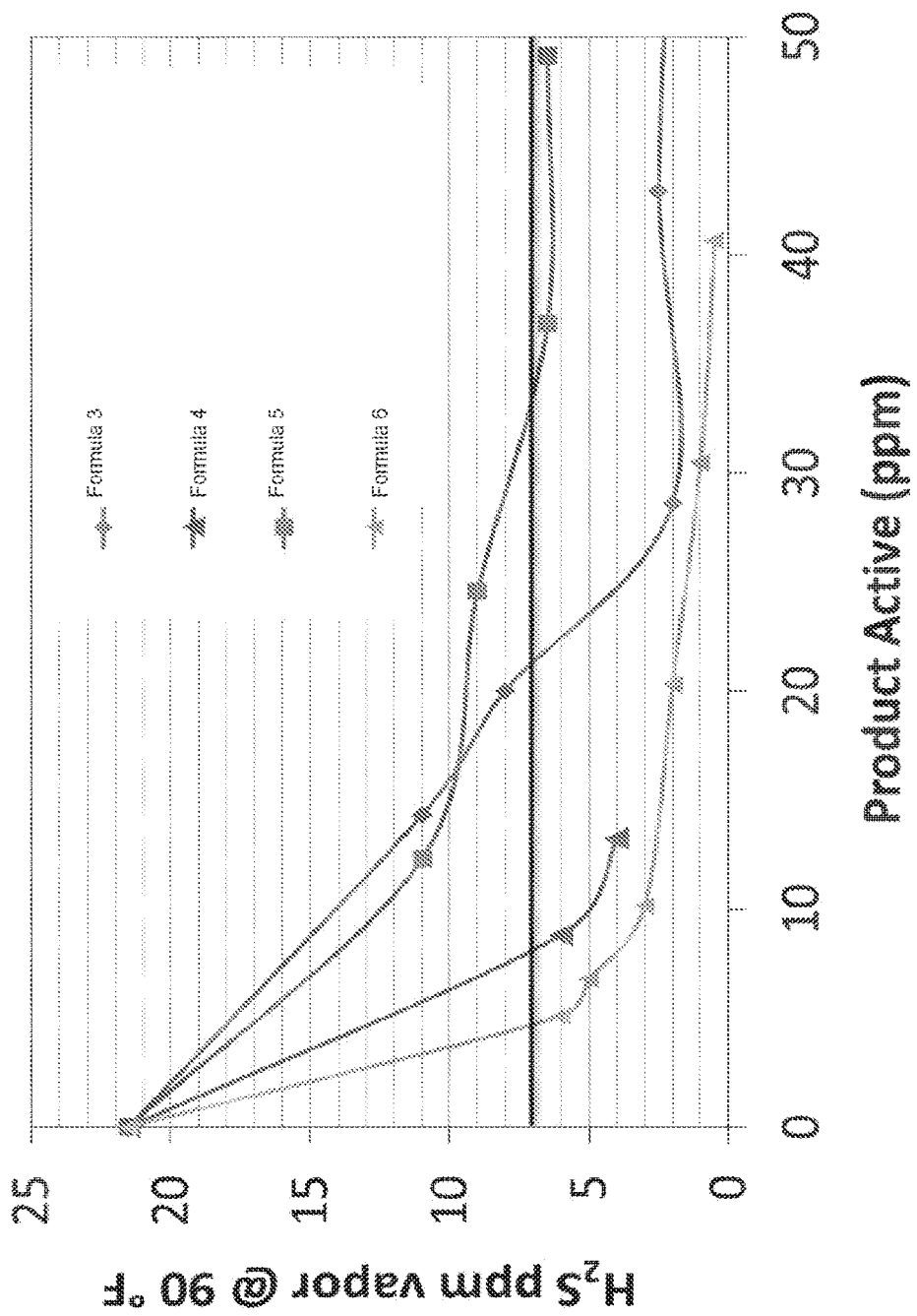
FIG. 2 is a graphical representation of the results obtained upon use of the sulfide scavenger of the invention in naphtha as reported in Example 2.

With reference to FIG. 2, in this example four experiments were conducted utilizing sour naphtha distillate at 90° F. as the target fluid and four scavenger formulas each having a different specific gravity. The specific gravity of the target fluid was 0.70.

A first experiment was conducted utilizing a triazine based scavenger Formula 3. The specific gravity of the scavenger Formula 3 was 1.10. The difference in specific gravity between the target fluid and the scavenger Formula 3 was 0.40. It can be seen from FIG. 2 that the $H_2S$ level was reduced from approximately 21.5 ppm, as measured in the vapor phase, to <3 ppm by volume at approximately 50 ppm of active Formula 3.

A second experiment was conducted utilizing a triazine based scavenger Formula 4. The specific gravity of the scavenger Formula 4 was 1.01. The difference in specific gravity between the target fluid and the scavenger Formula 4 was 0.31. Formula 4 was prepared by adding a solvent to Formula 3 in an amount effective to decrease the specific gravity to 1.01. The solvent used was water. Formula 4 was a 6-fold dilution of Formula 3. It can further be seen from FIG. 2, that the $H_2S$ vapor was reduced from approximately 21.5 ppm by volume, as measured in the vapor phase, to <4 ppm at approximately 12 ppm of active Formula 4.

A third experiment was conducted utilizing a glyoxal based scavenger Formula 5. The specific gravity of the scavenger Formula 1 was 1.26. The difference in specific gravity between the target fluid and the scavenger Formula 1 was 0.56. It can be seen from FIG. 2 that the $H_2S$ level was reduced from approximately 21.5 ppm by volume, as measured in the vapor phase, to <7 ppm at approximately 49 ppm of active Formula 5.

A fourth experiment was conducted utilizing a glyoxal based scavenger Formula 6. The specific gravity of the scavenger Formula 6 was 1.04. Formula 6 was prepared by adding a solvent to Formula 5 in an amount effective to decrease the specific gravity to 1.04. The solvent used was water. Formula 6 was a 6-fold dilution of Formula 5. The difference in specific gravity between the target fluid and the scavenger Formula 6 was 0.34. It can further be seen from FIG. 2, that the $H_2S$ vapor was reduced from approximately 21.5 ppm by volume, as measured in the vapor phase, to <1 ppm at approximately 42 ppm of active Formula 6.

Example 3

In this example, corrosion tests were performed by holding steel corrosion coupons at 77° C. for approximately six days. A first steel corrosion coupon 016 was held in a scavenger Formula 8. The glyoxal based scavenger Formula 8 was 40% by weight aqueous glyoxal having a specific gravity of 1.26.

A second steel corrosion coupon 015 was held in a process fluid including scavenger Formula 7. The specific gravity of the glyoxal based scavenger Formula 7 was 1.04. Formula 7 was prepared by adding a solvent to glyoxal based Formula 8 in an amount effective to decrease the specific gravity to 1.04. The solvent used was water. Formula 7 was a 6-fold dilution of Formula 8.

Corrosion rate can be determined through mass loss balance. This technique is suitable for generalized and localized corrosion and can be described as follows. Localized pitting and general corrosion were evaluated through surface examination before and after the trial. This exam was recorded using a digital camera with a magnification lens. This method is useful for evaluating the corrosive effect of a scavenger solution, particularly when localized corrosion has occurred.

Figure 3A:
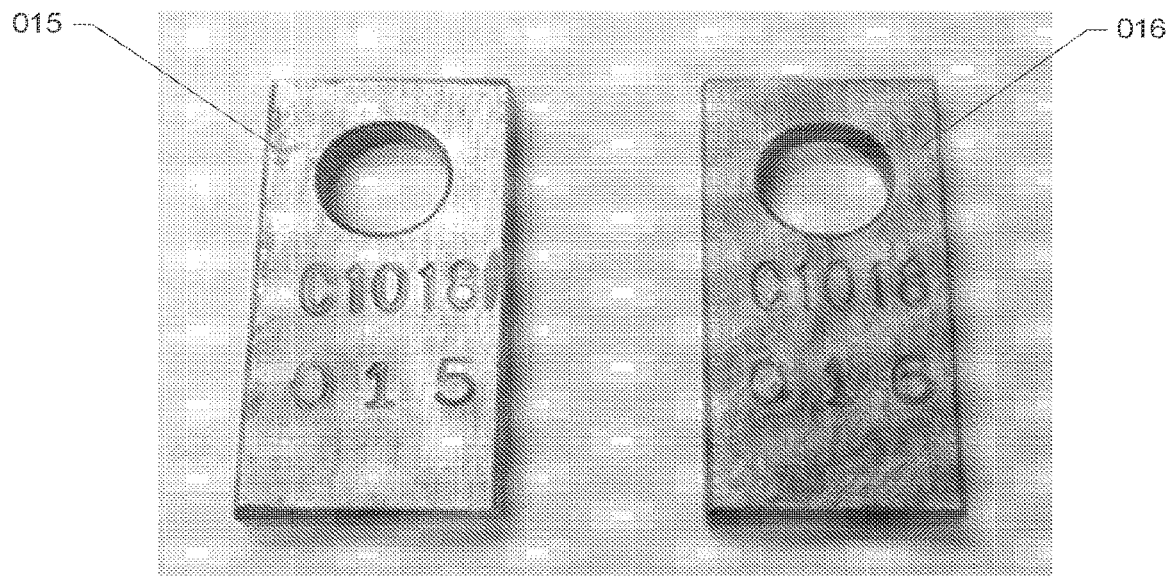
FIGS. 3A and 3B are graphical representations of the corrosion test results obtained upon use of the sulfide scavenger of the invention as reported in Example 3.
Figure 3B:
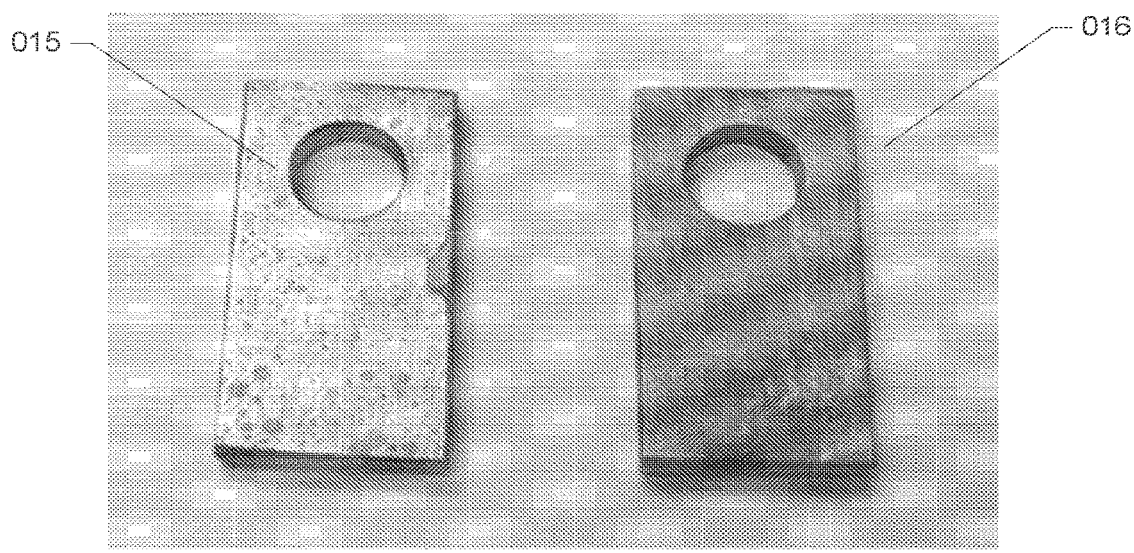

FIG. 3A is a magnified digital photo of steel corrosion coupons 015 and 016 prior to the corrosion test. FIG. 3B is a magnified digital photo of steel corrosion coupons 015 and 016 after being held at 77° C. in a process fluid including the Formulas 7 and 8, respectively, for approximately six days.

Results of the corrosion test are shown in Table 1, and FIGS. 3A and 3B. The steel test coupons 015 and 016 were weighed at the beginning and at the end of the trial. Visual examination of the surfaces of the coupons indicated the presence of localized or pitting corrosion on steel test coupon 016 as demonstrated in FIG. 3B. The corrosion rate, was determined as mils per year of loss of metal. The corrosion rate data for these steel test coupons 015 and 016 are given in Table 1.

TABLE 1

| COUPON # | PRODUCT | PPM | Wt./gr. initial | Wt./gr. final | DELTA Wt. gr. | MPY |
|---|---|---|---|---|---|---|
| 015 | Formula 7 | 5000 | 7.1491 | 7.1394 | 0.0097 | 3.1 |
| 016 | Formula 8 | 5000 | 7.1037 | 6.7095 | 0.3942 | 125 |

The test coupons tested with two different scavenger compositions demonstrated significantly different corrosion rates. The corrosion rate for steel test coupon 015 was 3.1 MPY. The corrosion rate for steel test coupon 016 was 125 MPY. The steel test coupon 016 tested with a glyoxal based Formula 8 scavenger solution showed extensive corrosion exhibiting edge and pitting attack (see steel test coupon 016, FIG. 3B). The steel test coupon 015 tested with dilute solution demonstrated a significantly reduced corrosion rate compared to the more concentrated scavenger solution of Formula 8 used with steel test coupon 016.

Example 4

With reference to Table 2 below, in this example, a first control experiment, and six experiments utilizing a glyoxal based scavenger composition at a dosage of 1000 ppm were conducted. The target fluid was bunker fuel having a specific gravity of 1.02.

The specific gravity of the scavenger composition was adjusted utilizing one of water, glycerol, and methanol as a solvent.

An $H_2S$ vapor level at 110° C. degrees was measured after the addition of the scavenger composition. The $H_2S$ vapor level measurements are ±200 ppm. The results of the experiment are shown in Table 2 below.

TABLE 2

| Solvent | Concentration. of glyoxal (%) | Specific. Gravity. of scavenger | Δ sp. gr. (between scavenger & fluid) | % density difference | Vapor H$_2$S ppm @ 110° C. (±200 ppm) |
|---|---|---|---|---|---|
| none | none | none | 0 | 0% | 2700 |
| water | 39 | 1.26 | 0.24 | 24% | 2000 |
| water | 19.5 | 1.13 | 0.11 | 11% | 1600 |
| water | 13 | 1.09 | 0.07 | 7% | 1600 |
| water | 6.5 | 1.04 | 0.02 | 2% | 1800 |
| glycerol | 6.5 | 1.26 | 0.24 | 24% | 2500 |
| methanol | 6.5 | 0.87 | 0.15 | 15% | 2500 |

The Examples clearly demonstrate that the adjustment of specific gravity by the addition of a solvent is effective at mitigation of corrosion by glyoxal. Corrosion generally occurs when the metal is contacted by the scavenger composition as it settles out of the fluid stream. Reducing the settling time of the scavenger in the fluid stream not only provides additional time and opportunity for reaction of the scavenger with the H$_2$S, but also reduces the duration of the contact between the scavenger with the metal, thereby reducing the corrosion rate.

It will be apparent to those skilled in the art that many modifications can be made in the methods and compositions herein disclosed without departing from the spirit of the invention. It is to be understood that the scope of the invention is to be limited solely by the scope of the appended claims.

The invention claimed is:

1. A method for making a sulfide scavenger comprising reducing a settling velocity of the sulfide scavenger in a target industrial process fluid by adjusting a specific gravity of the sulfide scavenger to be within fifteen percent or less of a specific gravity of the target industrial process fluid, wherein the scavenger is present from about 1 percent by weight to about 25 percent by weight of a total weight of a sulfide scavenger solution.

2. The method as in claim 1, wherein adjusting the specific gravity of the sulfide scavenger comprises decreasing the specific gravity of the sulfide scavenger by adding a solvent in a quantity sufficient to cause the specific gravity of the sulfide scavenger to be within fifteen percent or less of the specific gravity of the target industrial process fluid.

3. The method as in claim 2, wherein the solvent comprises at least one member selected from the group consisting of water, alcohol, glycol, and glycol ether.

4. The method as in claim 1, wherein adjusting the specific gravity of the sulfide scavenger comprises decreasing the specific gravity of the sulfide scavenger by adding an aldehyde in a concentration and a quantity sufficient to cause the specific gravity of the sulfide scavenger to be within fifteen percent or less of the specific gravity of the target industrial process fluid.

5. The method as in claim 4, wherein the aldehyde comprises glyoxal.

6. A method for making a sulfide scavenger, the method comprising:
providing a sulfide scavenger, and
reducing a settling velocity of the sulfide scavenger in a target industrial process fluid by adjusting a specific gravity of a solution comprising at least one of an aldehyde, hemiacetal, acetal, hexahydrotriazine, amine, amine-aldehyde adduct, hydantoin, oxazolidine, transition metal salt, and an alkali metal hydroxide to within about fifteen percent or less of a specific gravity of the target industrial process fluid.

7. The method as in claim 6, wherein the sulfide scavenger comprises a non-ionic surfactant or a quaternary ammonium surfactant.

8. The method as in claim 6, wherein the transition metal salt comprises at least one cation member selected from the group consisting of zinc, iron, copper, molybdenum, cobalt, manganese, and combinations thereof, and at least one anion member selected from the group consisting of chloride, acetate, nitrate, nitrite, carbonate, citrate, phosphate, sulfate, sulfite, gluconate, and combinations thereof;
wherein the amine-aldehyde adduct comprises a reaction product of the aldehyde with at least one of polyamines, secondary amines, and combinations thereof;
wherein the aldehyde comprises at least one member selected from the group consisting of formaldehyde, glyoxal, glutaraldehyde, acrolein, glyoxylic acid, and combinations thereof;
wherein the alkali metal hydroxide comprises at least one member selected from the group consisting of sodium hydroxide and potassium hydroxide; or
wherein the hexahydrotriazine comprises a reaction product of formaldehyde with at least one member selected from the group consisting of monoethanolamine, methylamine, methoxypropylamine, isopropanolamine and combinations thereof.

9. The method as in claim 6, wherein the hexahydrotriazine comprises monoethanolamine hexahydrotriazine or methylamine hexahydrotriazine.

10. The method as in claim 6, wherein the hemiacetal comprises a reaction product of an aldehyde with at least one alcohol selected from the group consisting of methanol, ethylene glycol, glycerol, propylene glycol, butanol, glucose, and combinations thereof.

11. The method as in claim 6, wherein the hemiacetal comprises a reaction product of
(a) ethylene glycol and formaldehyde,
(b) glycerol and formaldehyde,
(c) propylene glycol and formaldehyde,
(d) glucose and formaldehyde,
(e) glyoxal and methanol,
(f) glyoxal and ethanol,
(g) glyoxal and propanol, and/or
(h) glyoxal and butanol.

12. The method as in claim 6, wherein the hydantoin comprises at least one member selected from the group consisting of dimethylol dimethyl hydantoin, methylol dimethyl hydantoin, dimethyl hydantoin and combinations thereof.

13. A method for removing sulfide in an industrial process fluid, comprising
obtaining a measurement of a specific gravity of the industrial process fluid;
obtaining a measurement of a specific gravity of a scavenger composition comprising at least one aldehyde;
reducing a settling velocity of the scavenger composition in the industrial process fluid by adjusting the specific gravity of the scavenger composition to within about fifteen percent or less of the specific gravity of the industrial process fluid; and
adding to the industrial process fluid an effective amount of the adjusted scavenger composition,
wherein the adjusted sulfide scavenger composition is added to the industrial process fluid in an amount ranging from about 10 ppm to about 100,000 ppm by volume of the industrial process fluid.

14. The method as in claim 13, wherein adjusting the specific gravity of the scavenger composition comprises decreasing the specific gravity of the scavenger composition by adding a solvent in a quantity sufficient to cause the specific gravity of the scavenger composition to be within fifteen percent or less of the specific gravity of the industrial process fluid.

15. The method as in claim 14, wherein the solvent is selected from the group consisting of water, alcohols, glycols and glycol ethers.

16. The method as in claim 13, wherein adjusting the specific gravity of the scavenger composition comprises decreasing the specific gravity of the scavenger composition by adding an aldehyde solution in a concentration and a quantity sufficient to cause the specific gravity of the scavenger composition to be within fifteen percent or less of the specific gravity of the industrial process fluid.

17. The method as in claim 13, wherein the at least one aldehyde comprises at least one member selected from the group consisting of formaldehyde, glyoxal, glutaraldehyde, acrolein, glyoxylic acid, and combinations thereof.

18. The method as in claim 13, wherein the aldehyde comprises glyoxal.

19. A method for removing sulfide in an industrial process fluid, comprising
obtaining a measurement of a specific gravity of the industrial process fluid;
obtaining a measurement of a specific gravity of a scavenger composition comprising at least one hexahydrotriazine;
reducing a settling velocity of the scavenger composition in the industrial process fluid by adjusting the specific gravity of the scavenger composition to within about fifteen percent or less of the specific gravity of the industrial process fluid; and
adding to the industrial process fluid an effective amount of the adjusted scavenger composition.

20. The method as in claim 19, wherein the hexahydrotriazine comprises a reaction product of formaldehyde with at least one member selected from the group consisting of monoethanolamine, methylamine, methoxypropylamine, isopropanolamine and combinations thereof.

21. The method as in claim 20, wherein the hexahydrotriazine comprises monoethanolamine hexahydrotriazine.

22. The method as in claim 19, wherein adjusting the specific gravity of the scavenger composition comprises decreasing the specific gravity of the scavenger composition by adding a solvent in a quantity sufficient to cause the specific gravity of the scavenger composition to be within fifteen percent or less of the specific gravity of the industrial process fluid.

* * * * *